US010772323B2

(12) United States Patent
Sharma et al.

(10) Patent No.: US 10,772,323 B2
(45) Date of Patent: *Sep. 15, 2020

(54) BENZOIC ACID HERBICIDE COMPOSITION

(71) Applicant: NUFARM AUSTRALIA LIMITED, Laverton North, Victoria (AU)

(72) Inventors: Sumit Sharma, Werribee (AU); Aristos Panayi, Taylors Hill (AU); Chad Richard Ord Sayer, Brighton (AU)

(73) Assignee: NUFARM AUSTRALIA LIMITED, Laverton North, Victoria (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/571,750

(22) PCT Filed: May 6, 2016

(86) PCT No.: PCT/AU2016/050334
§ 371 (c)(1),
(2) Date: Nov. 3, 2017

(87) PCT Pub. No.: WO2016/176740
PCT Pub. Date: Nov. 10, 2016

(65) Prior Publication Data
US 2018/0153161 A1 Jun. 7, 2018

(30) Foreign Application Priority Data
May 7, 2015 (AU) .................. 2015901642

(51) Int. Cl.
*A01N 25/02* (2006.01)
*A01N 25/04* (2006.01)
(Continued)

(52) U.S. Cl.
CPC ............. *A01N 25/04* (2013.01); *A01N 25/02* (2013.01); *A01N 25/30* (2013.01); *A01N 33/04* (2013.01);
(Continued)

(58) Field of Classification Search
None
See application file for complete search history.

(56) References Cited

U.S. PATENT DOCUMENTS 4,213,776 A 7/1980 Giilck et al.
6,803,345 B2 10/2004 Herold et al.
(Continued)

FOREIGN PATENT DOCUMENTS

| EP | 2815649 A1 | 12/2014 |
| GB | 1079622 A | 8/1967 |
| WO | 2007/030885 A1 | 3/2007 |
| WO | 2007/140332 A2 | 12/2007 |
| WO | 2011/019652 A2 | 2/2011 |
| WO | 2011/080208 A1 | 7/2011 |
| WO | 2011/082162 A1 | 7/2011 |
| WO | 2012/003441 A1 | 1/2012 |
| WO | 2012/040785 A1 | 4/2012 |
| WO | 2013/082016 A1 | 6/2013 |
| WO | 2013/126947 A1 | 9/2013 |

(Continued)

OTHER PUBLICATIONS

Armel et al., UT Extension, Common Commerical Pre-packaged Herbicide Mixtures, pp. 1-28. (Year: 2008).*
Extended European Search Report for Application No. 16788966.6 (dated Oct. 19, 2018).
International Search Report and Written Opinion for corresponding Application No. PCT/AU2016/050334 (dated Jul. 4, 2016).
International Preliminary Report on Patentability for corresponding Application No. PCT/AU2016/050334 (dated Mar. 28, 2017).
ANON, "Material Safety Data Sheet: Product Name: Solvesso 200 Fluid," Pure Chemicals Co., Chennai, Tamilnadu, India (2014).
International Search Report and Written Opinion for Application No. PCT/AU2016/050336 (dated Jun. 10, 2016).
International Preliminary Report on Patentability for Application No. PCT/AU2016/050336 (dated Sep. 4, 2017).
International Search Report and Written Opinion for Application No. PCT/AU2016/050337 (dated Jun. 7, 2016).

(Continued)

*Primary Examiner* — Abigail Vanhorn
(74) *Attorney, Agent, or Firm* — Troutman Pepper Hamilton Sanders LLP (Rochester)

(57) ABSTRACT

An emulsifiable concentrate comprising a benzoic acid herbicide in acid form dissolved in an amide solvent and an amide solvent and an amine emulsion stabiliser. Preferably: •the benzoic acid herbicide is selected from TBA, chloramben and dicamba acid, •the amine is of the formula (I) $NR^1R^2R^3$ where wherein $R^1$, $R^2$ and $R^3$ are independently selected from the group selected from hydrogen; $C_1$ to $C_{10}$ alkyl; $C_5$ or $C_6$ cycloaliphatic optionally substituted with from one to four $C_1$ to $C_4$ alkyl groups and/or an amino-$C_1$ to $C_4$ alkyl group; $C_1$ to $C_{10}$ alkyl substituted with a substituent selected from the group consisting of hydroxyl, $C_1$ to $C_{10}$ alkoxy, amino, ($C_1$ to $C_5$ alkyl)amino and di-($C_1$ to $C_6$ alkyl)amino; and the group wherein two of $R_1$, $R^2$ and $R^3$ together form a ring of 5 or 6 constituent ring members selected from methylene, —O—, —N(H)— and —N($C_1$ to $C_6$-alkyl) and the other of $R^1$, $R^2$ and $R^3$ is selected from hydrogen, $C_1$ to $C_5$ alkyl and $C_1$ to $C_5$ alkyl substituted with a substituent selected from the group consisting of hydroxyl, $C_1$ to $C_5$ alkoxy, amino and ($C_1$ to $C_5$ alkyl)amino; and wherein at least one of $R^1$, $R^2$ and $R^3$ is other than hydrogen, and •the amide solvents are of the formula (II) $R^4$—CON—$R^5R^6$ where R is selected from the group consisting of hydrogen and $C_1$ to $C_{17}$ hydrocarbyl, and $R^5$ and $R^6$ are is selected from the group consisting of $C_1$ to $C_{15}$ hydrocarbyl and may together from a ring incorporating the nitrogen of the amide comprising 4 or 5 methylene groups.

18 Claims, No Drawings

(51) Int. Cl.
  *A01N 37/40* (2006.01)
  *A01N 25/30* (2006.01)
  *A01N 33/04* (2006.01)
  *A01N 33/08* (2006.01)
  *A01N 37/20* (2006.01)

(52) U.S. Cl.
  CPC ............ *A01N 33/08* (2013.01); *A01N 37/20* (2013.01); *A01N 37/40* (2013.01); *A01N 2300/00* (2013.01)

(56) References Cited

U.S. PATENT DOCUMENTS

| | | |
|---|---|---|
| 8,044,059 B2 | 10/2011 | Hopkins et al. |
| 8,426,341 B2 | 4/2013 | Volgas et al. |
| 8,669,209 B2 | 3/2014 | Keeney et al. |
| 10,492,488 B2 * | 12/2019 | Panayi .................. A01N 25/02 |
| 2002/0107149 A1 | 8/2002 | Volgas et al. |
| 2003/0211943 A1 | 11/2003 | Harwell |
| 2009/0062121 A1 * | 3/2009 | Satchivi ................ A01N 43/40 504/105 |
| 2009/0215797 A1 | 8/2009 | Hopkins et al. |
| 2010/0016163 A1 * | 1/2010 | Keiper .................. A01N 25/30 504/206 |
| 2010/0105558 A1 | 4/2010 | Li et al. |
| 2011/0143938 A1 * | 6/2011 | Fowler .................. A01N 43/40 504/103 |
| 2013/0157862 A1 | 6/2013 | Panayi et al. |
| 2014/0371075 A1 | 12/2014 | Dieleman et al. |
| 2015/0105254 A1 | 4/2015 | Li |
| 2016/0050919 A1 | 2/2016 | Byrne et al. |
| 2018/0139955 A1 * | 5/2018 | Panayi .................. A01N 25/02 |
| 2018/0153160 A1 * | 6/2018 | Chetty .................. A01N 25/02 |

FOREIGN PATENT DOCUMENTS

| | | |
|---|---|---|
| WO | 2015/054561 A1 | 4/2015 |
| WO | 2016/050782 A1 | 4/2016 |

OTHER PUBLICATIONS

Extended European Search Report for Application No. 16788968 (dated Nov. 2, 2018).

Armel et al., "Common Commercial Pre-Packaged Herbicide Mixtures," UT Extension 1-28 (2008).

Office Action in U.S. Appl. No. 15/571,729 (dated Apr. 16, 2020).

* cited by examiner

BENZOIC ACID HERBICIDE COMPOSITION

This application is a national stage application under 35 U.S.C. § 371 of PCT Application No. PCT/AU2016/050334, filed May 6, 2016, which claims the priority benefit of Australia Patent Application No. 2015901642, filed May 7, 2015.

TECHNICAL FIELD

Field

The invention relates to an emulsifiable concentrate composition containing benzoic acid herbicide in acid form, to a process for preparation of the composition and method for control of plant growth using the composition.

Background

Benzoic acid herbicides such as TBA (2,3,5-triiodobenzoic acid), chloramben3-amino-2,5-dichlorobenzoic acid) and dicamba (3,6-dichloro-2-methoxybenzoic acid) have been used as herbicides in the form of their esters and salts for many years.

Dicamba (3,6-dichloro-2-methoxybenzoic acid) is a herbicide used in control of broad leaf weeds in winter cereals, pastures, conservation tillage, sugar cane, turf, rice and also in non-crop areas. Dicamba may also be formulated with other herbicides such as other synthetic auxin herbicides as well as glyphosate and glufosinate based herbicides for use in fallow weed control and for use over genetically modified crops.

Benzoic acid herbicides in the acid form have poor solubility in water. For example dicamba in acid form has a water solubility of about 4500 mg/L at 25° C. and is commonly formulated as an ester, such as the dicamba methyl ester or an amine salt such as the dimethylamine salt or as a diglycolamine or aminoethoxyethanol salt. The dicamba esters, such as dicamba methyl ester, are more active than the salts but are more likely to volatilize with the potential to damage off-target plants. The benzoic acid esters and salts are each converted in the target plants to the acid form which is active in controlling plant growth.

Some acid herbicides have been formulated as the form of the acid. Volgas et al. (U.S. Pat. No. 8,426,341) discloses an acid herbicide concentrate with a specific alcohol ethoxylate emulsifier to form a microemulsion on dilution with water.

Groenewegen et al. (US 2012/0283103) describes the use of certain fatty acid amide solvents to form concentrate emulsions (CEs) and emulsifiable concentrates (ECs) of synthetic auxin herbicides. The amide solvents are said to have high solvency for water insoluble compounds in preparing concentrates in the form of an emulsion (CEs) and emulsifiable concentrates (ECs).

We have found that emulsifiable concentrates of benzoic acid herbicides in amide solvents have poor solution stability on storage giving rise to crystal formation in the concentrate and/or crystal formation on dilution of the concentrate to form an emulsion. Poor storage stability and the consequential formation of precipitates can disrupt effective use of the herbicide through clogging of spray equipment and/or dosing of the herbicide at a lower rate than desired.

There is a need for a more highly stable emulsifiable concentrate of benzoic acid herbicides which stabilises a concentrate of the herbicide in the acid form.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY

We provide an emulsifiable concentrate comprising a benzoic acid herbicide in acid form dissolved in an amide solvent and at least one amine.

Preferably the amount of the amine in the concentrate composition is from 0.5% to 10% by weight, more preferably from 2% to 5%, still more preferably from 3% to 5% by weight of the amine based on the weight of the emusifiable concentrate.

There is further provided a method for the preparation of an emulsifiable concentrate comprising combining a benzoic acid herbicide with an amide solvent and amine and heating the compositions, preferably to a temperature of at least 40° C., more preferably 50° C., still more preferably at least 60° C. and most preferably at least 75° C., to provide a solution of the benzoic acid herbicide.

There is further provided a method of controlling weeds comprising providing an emulsifiable concentrate according to the above, diluting the concentrate with water to provide an emulsion and applying the diluted concentrate to the weeds to be controlled.

DETAILED DESCRIPTION

The term "emulsion", as used herein, refers to a fine dispersion of minute droplets of one liquid in another in which it is not soluble or miscible and includes microemulsions and macroemulsions. The term "emulsifiable concentrate" refers to concentrates which, on dilution with water, form an emulsion such as a spontaneous milky white emulsion comprising a dispersed water immiscible phase.

Throughout the description and the claims of this specification the word "comprise" and variations of the word, such as "comprising" and "comprises" is not intended to exclude other additives, components, integers or steps.

The concentrate composition comprises benzoic acid herbicide. Typically the benzoic acid herbicide will be present in an amount of at least 200 g benzoic acid herbicide per litre of emulsifiable concentrate preferably at least 250 g/L, more preferably at least 350 g/L, still more preferably at least 400 g/L and most preferably at least 450 g/L (such as at least 500 g/L or at least 550 g/L).

The benzoic acid herbicide is preferably TBA, chloramben, dicamba or a mixture of two or more thereof. Dicamba is the most preferred.

The emulsifiable concentrate composition comprises an amine. The amine is typically a primary secondary or tertiary amine and may comprise aliphatic straight or branched chain substituents, aliphatic ring substituents or may be the heteroatom of a aliphatic hetercyclic amine. The amine may comprise a plurality of amine groups and/or mixture of amines.

In one embodiment the amine comprises at least one of formula (I)

wherein $R^1$, $R^2$ and $R^3$ are independently selected from the group consisting of hydrogen, $C_1$ to $C_{10}$ alkyl; $C_5$ or $C_6$ cycloaliphatic optionally substituted with from one to four $C^1$ to $C^4$ alkyl groups and/or an amino-$C_1$ to $C_4$ alkyl group; $C_1$ to $C_{10}$ alkyl substituted with a substituent selected from the group consisting of hydroxyl, $C_1$ to $C_{10}$ alkoxy, amino, $C_1$ to $C_6$ alkylamino and di-($C_1$ to $C_6$ alkyl)amino; and the group wherein two of $R^1$, $R^2$ and $R^3$ together form a ring of 5 or 6 constituent ring members selected from methylene, —O—, —N— and —N($C_1$ to $C_6$-alkyl)- and the other of $R^1$, $R^2$ and $R^3$ is selected from hydrogen, $C_1$ to $C_6$ alkyl and $C_1$ to $C_6$ alkyl substituted with a substituent selected from the group consisting of hydroxyl, $C_1$ to $C_6$ alkoxy, amino and $C_1$ to $C_6$ alkylamino; and wherein at least one of $R_1$, $R_2$ and $R_3$ is other than hydrogen.

The concentrate composition comprises an amide solvent. The amide solvent is, in one set of embodiments, present in an amount of from 25% to 60% by weight of the composition, preferably from 25% to 50% and more preferably from 25% to 45% by weight of the emulsifiable concentrate composition.

Examples of suitable amide solvents include compounds of formula II:

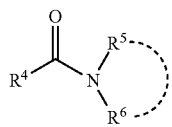

wherein
$R^4$ is selected from the group consisting of hydrogen and $C_1$ to $C_{17}$ hydrocarbyl;
$R^5$ is selected from the group consisting of $C_1$ to $C_{15}$ hydrocarbyl;
$R^6$ is selected from the group consisting of $C_1$ to $C_{15}$ hydrocarbyl; and
$R^5$ and $R^6$ may together from a ring incorporating the nitrogen of the amide comprising 4 or 5 methylene groups; preferred examples of $R^5$ and $R^6$ are independently selected from the group consisting of $C_1$ to $C_6$ hydrocarbyl and the group wherein $R^5$ and $R^6$ together form a ring incorporating the nitrogen of the amine by a bridging group $R^5 \ldots R^6$ of formula —$CH_2CH_2CH_2CH_2$— or —$CH_2CH_2CH_2CH_2CH_2$—.

In one embodiment the amide solvent is of formula II wherein
$R^4$ is selected from the group consisting of $C_3$ to $C_{17}$ alkyl, preferably $C_6$ to $C_{17}$ aliphatic; and
$R^5$ and $R^6$ are independently selected from the group $C_1$ to $C_6$ alkyl and the group wherein $R^5$ and $R^6$ together form a bridging group of formula selected from the group consisting of —$CH_2CH_2CH_2CH_2$— and —$CH_2CH_2CH_2CH_2CH_2$—, preferably $R^5$ and $R^6$ are independently selected from $C_1$ to $C_4$ alkyl or the group wherein $R^5$ and $R^6$ together form a bridging group of formula —$CH_2CH_2OCH_2CH_2$—, —$CH_2CH_2CH_2CH_2$— and —$CH_2CH_2CH_2CH_2CH_2$—.

In a preferred set of embodiments, the amide solvent of formula II wherein
$R^4$ is $C_6$ to $C_{17}$ alkyl; and
$R^5$ and $R^6$ are independently selected from $C_1$ to $C_4$ alkyl such as methyl, ethyl, n-propyl, isopropyl.

Examples of the amide solvents include
N,N-dimethyl fatty acid amides such as N,N-dimethyl $C_8$-$C_{10}$ fatty acid amide.
The preferred amide "solvents" are fatty acid amides comprising a $C_6$ to $C_{17}$ aliphatic group.
Specific examples of amide solvents include
N,N-dimethyl octanamide, N,N-dimethyl decanamide,
N,N-dimethyl caprylamide, N,N-dimethyl 2-ethylhexanoamide,
N,N-dimethyl oleamide,
N,N-dimethylLauricamide (also known as N,N-Diemthyl-dodecanamide),
N,N-dimethylmyristicamide (also known as N,N-dimethyl-tetradecanamide),
N,N-dimethyl 9-decenamide,
and mixtures of two or more thereof.

In one embodiment the amine comprises at least one of formula I

In one set of embodiments the amine is of formula I wherein $R^1$, $R^2$ and $R^3$ are independently selected from the group selected from hydrogen and $C_1$ to $C_{10}$ alkyl wherein at least one of $R^1$, $R^2$ and $R^3$ is $C_1$ to $C_{10}$ alkyl. Preferred amines in this group are mono-, di- and tri-($C_1$ to $C_6$ alkyl)amines and preferably tri-($C_1$ to $C_4$ alkyl)amines such as triethylamine.

In a further set of amines of formula I $R^1$, $R^2$ and $R^3$ are independently selected from the group consisting of hydrogen, $C_1$ to $C_{10}$ alkyl and $C_1$ to $C_{10}$ alkyl substituted with a substituent selected from the group consisting of hydroxyl, $C_1$ to $C_{10}$ alkoxy, amino, ($C_1$ to $C_6$ alkyl)amino and di-($C_1$ to $C_6$ alkyl)amino wherein at least one of $R^1$, $R^2$ and $R^3$ is other than hydrogen and $C_1$ to $C_{10}$ alkyl. Examples of amines in this group include compounds of formula I wherein $R^1$, $R^2$ and $R^3$ are independently selected from hydrogen, $C_1$ to $C_6$ alkyl and $C_1$ to $C_6$ alkyl substituted with a substituent selected from the group consisting of hydroxyl, $C_1$ to $C_6$ alkoxy, amino, ($C_1$ to $C_4$ alkyl)amino and di-($C_1$ to $C_4$ alkyl)amino wherein at least one of $R^1$, $R^2$ and $R^3$ is other than hydrogen and $C_1$ to $C_6$ alkyl. More specific examples of this group of compounds include $C_1$ to $C_6$ alkanolamines, di-($C_1$ to $C_6$ alkanol)amines, tri-($C_1$ to $C_6$ alkanol)amines, di-($C_1$ to $C_6$ alkyl)-$C_1$ to $C_6$ alkanolamines, (amino $C_1$ to $C_6$ alkyl)-di-($C_1$ to $C_6$ alkyl)amines and di-(amino $C_1$ to $C_6$ alkyl)($C_1$ to $C_6$ alkyl)amines.

In a further set of amines of formula I two of $R^1$, $R^2$ and $R^3$ together form a ring, incorporating the amine nitrogen, of 5 or 6 constituent ring members selected from the group consisting of methylene and optionally a further heteroatom ring member (in addition to the amine nitrogen) selected from —O—, —N(H)— and —N($C_1$ to $C_6$-alkyl)-; and the other of $R^1$, $R^2$ and $R^3$ is selected from hydrogen, $C_1$ to $C_6$ alkyl and $C_1$ to $C_6$ alkyl substituted with a substituent selected from the group consisting of hydroxyl, $C_1$ to $C_6$ alkoxy, amino and ($C_1$ to $C_6$ alkyl)amino The ring where at least two of $R^1$, $R^2$ and $R^3$ form a heterocyclic ring of 5 or 6 constituent members may, for example, be a ring selected from the group consisting of pyrrolidine, piperidine, morpholine and piperazine.

In a particularly preferred set of embodiments the amine is of formula I wherein $R^1$ is $C_1$ to $C_6$ hydroxyalkyl or ($C_1$ to $C_{10}$ alkoxy) substituted $C_2$ to $C_4$ alkyl and $R^2$ and $R^3$ are independently hydrogen or $C_1$ to $C_4$ alkyl.

The more preferred embodiments comprise the amine of formula I wherein $R^1$ is selected from the group consisting of $C_2$ to $C_6$ hydroxyalkyl and $C_1$ to $C_8$ alkoxy substituted $C_2$ to $C_4$ alkyl, and $R^2$ and $R^3$ are selected from hydrogen and $C_1$ to $C_4$ alkyl, preferably hydrogen or methyl.

In one set of embodiments the amine is of formula I wherein $R^1$ is $C_2$ to $C_6$ hydroxylalkyl or $C_1$ to $C_6$ alkoxy-substituted $C_2$ to $C_4$ alkyl and $R^2$ and $R^3$ are hydrogen or $C_1$ to $C_4$ alkyl.

In a further set of embodiments the amine is of formula I wherein $R^1$ is $C_2$ to $C_4$ hydroxyalkyl or $C_1$ to $C_6$ alkoxy substituted $C_2$ to $C_4$ alkyl and $R^2$ and $R^3$ are hydrogen.

The alkyl groups in the alkyl, alkoxy, and substituted alkyl portions may be branched or straight chain and are more preferably straight chain.

Specific examples of polyamines of formula I include compounds including an alkylene diamine group such N,N-Bis(3-aminopropyl)methylamine (BAPMA), Di methyl amino propyl amine (DMAPA); and cyclic polyamines: e.g. Aminoethylpiperazine (AEP), Dimethylpiperazine (DMP), 1-methyl-4-(2-dimethylaminoethyl)-piperazine and Isophorone diamine.

Specific examples of the more preferred amines of formula 1 are ethanolamine, methoxypropylamine and hexyloxypropylamine. Particularly preferred amines of formula I are methoxypropylamine, monoethanolamine and mixtures thereof.

The benzoic acid herbicide emulsifiable concentrate may and preferably will, include a hydrocarbon co-solvent. The hydrocarbon co-solvent preferably has a flash point of at least 60.5° C. The hydrocarbon co-solvent preferably comprises at least one hydrocarbon selected from alkyl substituted aromatics such as mono-, di- and trialkyl benzenes and alkyl naphthalenes. For example, $C_9$ alkyl benzene is reported to have a flash point of 42° C. whereas $C_{10}$ alkylbenzene is reported to have a flash point of 66° C. A preferred co-solvent is a mixture of $C_8$ to $C_{12}$ di- and tri-alkyl benzenes, commercially available from Exxon Mobil as Solvesso 150™ and Solvesso 200 ™ and their low naphthalene variants.

The hydrocarbon co-solvent is preferably in the range of from 2% to 25% w/w of the benzoic acid herbicide emulsifiable concentrate. Preferably the hydrocarbon co-solvent is present in an amount of from 5% to 20% w/w and more preferably from 5% to 15% w/w of the benzoic acid emulsifiable concentrate.

The benzoic acid herbicide emulsifiable concentrate will typically comprise an emulsifier component. The emulsifier component may, for example, be preferentially in an amount of from 2% w/w to 25% w/w of the dicamba emulsifiable concentrate. The emulsifier component preferably comprises from 5% w/w to 20% w/w and more preferably from 5% w/w to 15% w/w of the concentrate composition.

The emulsifier component may include anionic, nonionic, cationic or mixed types of emulsifiers. In one embodiment the concentrate comprises an anionic emulsifier in an amount in the range of from 1% w/w to 10% w/w of the concentrate.

In one set of embodiments, the composition comprises an alkylarylsulfonate emulsifier. Alkylarylsulfonates are anionic surfactants and are available in compositions containing suitable counterions which may be optionally substituted ammonium and metal counterions. Examples of alkylarylsulfonates include butylnaphthalenesulfonic acid, the di- and tri-isopropylnaphthalenesulfonic acids, the salts of the condensation products of sulfonated naphthalene and naphthalene derivatives with formaldehyde, the salts of the condensation products of sulfonated naphthalene and naphthalene derivatives with phenol and formaldehyde, and the salts of alkylarylbenzenesulfonic acids such as dodecylbenzenesulfonic acid. Benzenesulfonates, such as alkyl- or arylbenzenesulfonates, e.g. (poly)alkyl- and (poly)arylbenzenesulfonates which are acidic and neutralized with suitable bases, for example having 1 to 12 carbon atoms per alkyl radical or having up to 3 styrene units in the polyaryl radical, preferably (linear) dodecylbenzenesulfonic acid and oil-soluble salts thereof, such as, for example, the calcium salt or the isopropylammonium salt of dodecylbenzenesulfonic acid.

It is particularly preferred that the composition of the invention contain a salt of dodeclybenzenesulfonic acid. Preferred salts include calcium dodecylbenzenesulfonate and monoalkanolamine salts of dodecylbenzenesulfonate such as the monoethanolamine salt of dodecylbenzenesulfonate.

The composition preferably comprises a nonionic surfactant component. Preferred non-ionic surfactants include the condensation products of alkylene oxide with components forming nonpolar groups such as the condensation products of ethylene oxide with fatty alcohols such as oleyl alcohol and cetyl alcohol; the condensation products of ethylene oxide with phenols and alkylphenols such as isooctylphenol, octylphenol and nonylphenol; the condensation products of ethylene oxide with castor oil; the partial esters derived from long chain fatty acids and hexitol anhydrides, for example sorbitan monolaurate, and their condensation products with ethylene oxide; ethylene oxide/propylene oxide block copolymers; lauryl alcohol polyglycol ether acetal.

Examples of nonionic surfactants which may be used alone or in combination in the emulsifier component are listed below, in which EO=ethylene oxide units, such as PO=propylene oxide units and BO=butylene oxide units:

$C_{10}$-$C_{24}$-alcohols which may be alkoxylated, e.g. with 1-60 alkylene oxide units, preferably 1-60 EO and/or 1-30 PO and/or 1-15 BO in any order. The terminal hydroxyl groups of these compounds can be terminally capped by an alkyl, cycloalkyl or acyl radical having 1-24 carbon atoms. Examples of such compounds are:

Genapol® C., L, O, T, UD, UDD, X products from Clariant, Plurafac® and Lutensol® A, AT, ON, TO products from BASF, Marlipal® 24 and O13 products from Condea, Dehypon® products from Henkel, Ethylan® products from Akzo Nobel, such as Ethylan CD 120.

Copolymers consisting of EO, PO and/or BO units, such as, for example, block copolymers, such as the Pluronic® products from BASF and the Synperonic® products from Uniquema with a molecular weight of from 400 to $10^8$.

Alkyleneoxy adducts of $C_1$-$C_9$ alcohols, such as the Atlas® 5000 series, or in particular Atlas G-5002L from Croda Crop Care or Hoe® -S3510 from Clariant.

Fatty acid and triglyceride alkoxylates, such as the Serdox® NOG products from Condea or alkoxylated plant oils, such as soybean oil, rapeseed oil, corn oil, sunflower oil, cottonseed oil, linseed oil, coconut oil, palm oil, thistle oil, walnut oil, peanut oil, olive oil or rhicinus oil (i.e. castor oil), in particular rapeseed oil and castor oil, plant oils also being understood as meaning their transesterification products, e.g. alkyl esters, such as rapeseed oil methyl ester or rapeseed oil ethyl ester, for example the Emulsogen® products from Clariant, salts of aliphatic, cycloaliphatic and olefinic carboxylic acids and polycarboxylic acids, and alpha-sulfo fatty acid esters as available from Henkel. Particularly preferred in this group are castor oil ethoxylates such as TERMUL® 1284 and TERMUL® 1285 from Huntsman.

Fatty acid amide alkoxylates, such as the Comperlan® products from Henkel or the Amam® products from Rhodia.

Alkyleneoxy adducts of alkynediols, such as the Surfynol® products from Air Products. Sugar derivatives, such as amino and amido sugars from Clariant, glucitols from Clariant, alkyl polyglycosides in the form of the APG® products from Henkel or such as sorbitan esters in the form of the Span® or Tween® products from Uniquema or cyclodextrine esters or ethers from Wacker.

Alkyleneoxy adducts based on polyol, such as Polyglycol® products from Clariant. Interface-active polyglycerides and derivatives thereof from Clariant. Surface-active compounds based on silicone and/or silane, such as the Tegopren® products from Goldschmidt and the SE® products from Wacker, and the Bevaloid®, Rhodorsil® and Silcolapse® products from Rhodia (Dow Corning, Reliance, GE, Bayer).

Per- or polyfluorinated surface-active compounds, such as Fluowet® products from Clariant, the Bayowet® products from Bayer, the Zonyl® products from Du Pont and products of this type from Daikin and Asahi Glass.

Interface-active sulfonamides, e.g. from Bayer.

Surface-active polyvinyl compounds, such as modified polyvinylpyrolidone, such as the Luviskol® products from BASF and the Agrimer® products from ISP or the derivatized polyvinylacetates, such as the Mowilith® products from Clariant or the butyrates, such as the Lutonal® products from BASF, the Vinnapas® and the Pioloform® products from Wacker or modified polyvinyl alcohols, such as the Mowiol® products from Clariant.

Surface-active polymers based on maleic anhydride and/or reaction products of maleic anhydride, and maleic anhydride and/or reaction products of copolymers which include maleic anhydride, such as the Agrimer®-VEM A products from ISP.

Surface-active derivatives of montane, polyethylene and polypropylene waxes, such as the Hoechst® waxes or the Licowet® products from Clariant.

Poly- or perhalogenated surfactants, such as, for example Emulsogen®-1557 from Clariant.

Phenols which may be alkoxylated, for example phenyl ($C_1$-$C_4$)alkyl ethers or (poly)alkoxylated phenols [=phenol (poly)alkylene glycol ethers], for example having 1 to 50 alkyleneoxy units in the (poly)alkyleneoxy moiety, where the alkylene moiety preferably in each case has 1 to 4 carbon atoms, preferably phenol reacted with 3 to 10 mol of alkylene oxide.

(Poly)alkylphenols or (poly)alkylphenol alkoxylates [=polyalkylphenol (poly)alkylene glycol ethers], for example with 1 to 12 carbon atoms per alkyl radical and 1 to 150 alkyleneoxy units in the polyalkyleneoxy moiety, preferably tri-n-butylphenol or triisobutylphenol reacted with 1 to 50 mol of ethylene oxide, Polyarylphenols or polyarylphenol alkoxylates [=polyarylphenol (poly)alkylene glycol ethers], for example tristyrylphenol polyalkylene glycol ethers with 1 to 150 alkyleneoxy units in the polyalkyleneoxy moiety, preferably tristyrylphenol reacted with 1 to 50 mol of ethylene oxide.

Examples of surfactants from the group of aromatic-based surfactants are the surfactants of the abovementioned groups, preferably phenol reacted with 4 to 10 mol of ethylene oxide, available commercially, for example, in the form of the Agrisol® products (Akcros), triisobutylphenol reacted with 4 to 50 mol of ethylene oxide, commercially available, for example, in the form of the Sapogenat® T products (Clariant), nonylphenol reacted with 4 to 50 mol of ethylene oxide, commercially available, for example, in the form of the Arkopal® products (Clariant), tristyrylphenol reacted with 4 to 150 mol of ethylene oxide, for example from the Soprophor® series, such as Soprophor® FL, Soprophor® 3D33, Soprophor® BSU, Soprophor® 4D-384, Soprophor® CY/8 (Rhodia).

The non-ionic emulsifier present in the compositions of the invention may comprise one such surfactant or a blend of two or more non-ionic surfactants.

The emulsifier is more preferably selected from alcohol ethoxylates, fatty acid ethoxylates, fatty amide ethoxylates and EO/PO block copolymers including butyl based block copolymers. The non-ionic emulsifier preferably comprises in the range of from 2% w/w to 25% w/w of the composition. More preferably the non-ionic emulsifier comprises in the range of from 2% w/w to 20% w/w and more preferably from 2% w/w to 15% w/w of the concentrate.

In one embodiment, the anionic emulsifier comprises from 1% to 10% w/w of the composition and the non-ionic emulsifier comprises from 2% to 15% w/w of the composition.

In one set of embodiments the concentrate composition comprises:
  dicamba acid in an amount of at least 250 g/L, more preferably at least 300 g/L and still more preferably at least 400 g/L and most preferably at least 450 g/L;
  amide solvent, preferably fatty acid amide in an amount of from 25% to 60% w/w of the composition, more preferably 25% to 50% w/w and most preferably 25% to 45% w/w of the concentrate;
  hydrocarbon co-solvent preferably selected from the group of $C_8$-$C_{12}$ di- and tri-alkylbenzenes in an amount of from 2% to 25% w/w, more preferably 5% to 20% w/w and most preferably 5% to 15% w/w of the concentrate;
  anionic emulsifier in an amount of from 1% to 10% w/w of the composition;
  non-ionic emulsifier in an amount of from 2% to 25% w/w, more preferably 2% to 20% w/w and still more preferably 2% to 15% w/w of the concentrate composition; and
  monoethanolamine, methoxypropylamine, hexyloxypropylamine or mixture of two or more thereof in an amount of from 0.5% to 5% by weight based on the weight of the emulsifiable concentrate, more preferably from 2% to 5% by weight based on the weight of the emulsifiable concentrate and still more preferably from 3% to 5% by weight based on the weight of the emulsifiable concentrate.

The composition of the invention has been found to provide good storage stability and also forms an emulsion on dilution with water which has good stability to allow effective application to plants.

There is further provided a method for the preparation of an emulsifiable concentrate of comprising combining benzoic acid herbicide with an amide solvent and amine and heating the compositions, preferably to a temperature of at least 40° C., more preferably 50° C., still more preferably at least 60° C. and most preferably at least 75° C., to provide a solution of the benzoic acid herbicide.

In a further aspect, the invention provides a method of controlling weeds comprising providing an emulsifiable concentrate as hereinbefore described; diluting the concentrate with water to form an emulsion and applying the diluted composition to the weeds.

In a further embodiment the invention provides a method of applying a benzoic acid emulsifiable concentrate composition comprising:

providing an emulsifiable concentrate of benzoic acid herbicide as herein disclosed;

combining the emulsifiable concentrate with a water and optionally a liquid nitrogenous fertilizer to form an oil-in-water emulsion having a discontinuous oil phase comprising the water immiscible solvent;

applying the oil in water emulsion to weeds to be controlled preferably by spray application.

The emulsifiable concentrate may be combined with the liquid fertilizer with additional water being combined with the concentrate and/or the fertilizer or alternatively in some cases an emulsion may be formed with the neat concentrate using liquid nitrogenous fertilizer in the form supplied by the manufacturer.

The composition may comprise one or more further actives selected from the group consisting of herbicides, fungicides, insecticides, plant growth regulators, biologicals and mixtures of two or more thereof.

Examples of additional herbicides may be selected from the following classes:

amide herbicides such as allidochlor, beflubutamid, benzadox, benzipram, bromobutide, cafenstrole, CDEA, cyprazole, dimethenamid, dimethenamid-P, diphenamid, epronaz, etnipromid, fentrazamide, flupoxam, fomesafen, halosafen, isocarbamid, isoxaben, napropamide, naptalam, pethoxamid, propyzamide, quinonamid and tebutam;

anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil;

arylalanine herbicides such as benzoylprop, flamprop and flamprop-M;

chloroacetanilide herbicides such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor;

sulfonanilide herbicides such as benzofluor, cloransulam, diclosulam, florasulam, flumetsulam, metosulam, perfluidone, pyrimisulfan and profluazol;

sulfonamide herbicides such as asulam, carbasulam, fenasulam, oryzalin, penoxsulam and pyroxsulam, see also sulfonylurea herbicides;

thioamide herbicides such as bencarbazone and chlorthiamid;

antibiotic herbicides such as bilanafos;

aromatic acid herbicides pyrimidinyloxybenzoic acid herbicides such as bispyribac and pyriminobac;

pyrimidinylthiobenzoic acid herbicides such as pyrithiobac;

phthalic acid herbicides such as chlorthal;

picolinic acid herbicides such as aminopyralid, clopyralid and picloram;

quinolinecarboxylic acid herbicides such as quinclorac and quinmerac;

arsenical herbicides such as cacodylic acid, CMA, DSMA, hexaflurate, MAA, MAMA, MSMA, potassium arsenite and sodium arsenite;

benzoylcyclohexanedione herbicides such as mesotrione, sulcotrione, tefuryltrione and tembotrione;

benzofuranyl alkylsulfonate herbicides such as benfuresate and ethofumesate;

carbamate herbicides such as asulam, carboxazole, chlorprocarb, dichlormate, fenasulam, karbutilate and terbucarb;

carbanilate herbicides such as barban, BCPC, carbasulam, carbetamide, CEPC, chlorbufam, chlorpropham, CPPC, desmedipham, phenisopham, phenmedipham, phenmedipham-ethyl, propham and swep;

cyclohexene oxime herbicides such as alloxydim, butroxydim, clethodim, cloproxydim, cycloxydim, profoxydim, sethoxydim, tepraloxydim and tralkoxydim;

cyclopropylisoxazole herbicides such as isoxachlortole and isoxaflutole;

dicarboximide herbicides such as benzfendizone, cinidonethyl, flumezin, flumiclorac, flumioxazin, and flumipropyn;

dinitrophenol herbicides such as dinofenate, dinoprop, dinosam, dinoseb, dinoterb, DNOC, etinofen and medinoterb;

diphenyl ether herbicides such as ethoxyfen;

nitrophenyl ether herbicides such as acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen and oxyfluorfen;

dithiocarbamate herbicides such as dazomet and metam;

halogenated aliphatic herbicides such as alorac, chloropon, dalapon, flupropanate, hexachloroacetone, iodomethane, methyl bromide, monochloroacetic acid, SMA and TCA;

imidazolinone herbicides such as imazamethabenz, imazamox, imazapic, imazapyr, imazaquin and imazethapyr;

inorganic herbicides such as ammonium sulfamate, borax, calcium, chlorate, copper sulfate, ferrous sulfate, potassium azide, potassium, yanate, sodium azide, sodium chlorate and sulfuric acid;

nitrile herbicides such as bromobonil, bromoxynil, chloroxynilm, iodobonil, ioxynil and pyraclonil;

organophosphorus herbicides such as amiprofos-methyl, anilofos, bensulide, bilanafos, butamifos, 2,4-DEP, DMPA, EBEP, fosamine, glufosinate, glyphosate, and piperophos;

oxadiazolone herbicides such as dimefuron, methazole, oxadiargyl and oxadiazon;

phenoxy herbicides such as bromofenoxim, clomeprop, 2,4-DEB, 2,4-DEP, difenopenten, disul, erbon, etnipromid, fenteracol and trifopsime;

phenoxyacetic herbicides such as 4-CPA, 2,4-D, 3,4-DA, MCPA, MCPA-thioethyl and 2,4,5-T;

phenoxybutyric herbicides such as 4-CPB, 2,4-DB, 3,4-DB, MCPB and 2,4,5-TB;

phenoxypropionic herbicides such as cloprop, 4-CPP, dichlorprop, dichlorprop-P, 3,4-DP, fenoprop, mecoprop and mecoprop-P;

aryloxyphenoxypropionic herbicides such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop;

phenylenediamine herbicides such as dinitramine, and prodiamine;

phenyl pyrazolyl ketone herbicides such as benzofenap, pyrasulfotole, pyrazolynate, pyrazoxyfen and topramezone;

pyrazolylphenyl herbicides such as fluazolate, nipyraclofen and pyraflufen;

pyridazine herbicides such as credazine, pyridafol and pyridate;

pyridazinone herbicides such as brompyrazon, chloridazon, dimidazon, flufenpyr, metflurazon, norflurazon, oxapyrazon and pydanon;

pyridine herbicides such as aminopyralid, cliodinate, clopyralid, dithiopyr, fluroxypyr, haloxydine, picloram, picolinafen, pyriclor, thiazopyr and triclopyr;

pyrimidinediamine herbicides such as iprymidam and tioclorim;

quaternary ammonium herbicides such as cyperquat, diethamquat, difenzoquat, diquat, morfamquat and paraquat;

thiocarbamate herbicides such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vernolate;

thiocarbonate herbicides such as dimexano, EXD, proxan and eptam (EPTC);

thiourea herbicides such as methiuron;

triazine herbicides such as dipropetryn; triaziflam and trihydroxytriazine;

chlorotriazine herbicides such as atrazine; chlorazine, cyanazine, cyprazine, eglinazine, ipazine, mesoprazine, procyazine, proglinazine, propazine, sebuthylazine, simazine, terbuthylazine and trietazine;

methoxytriazine herbicides such as atraton, methometon, prometon, secbumeton, simeton and terbumeton;

methylthiotriazine herbicides such as ametryn, aziprotryne, cyanatryn, desmetryn, dimethametryn, methoprotryne, prometryn, simetryn and terbutryn;

triazinone herbicides such as ametridione, amibuzin, hexazinone, isomethiozin, metamitron and metribuzin;

triazole herbicides such as amitrole, cafenstrole, epronaz and flupoxam;

triazolone herbicides such as amicarbazone, bencarbazone, carfentrazone, flucarbazone, propoxycarbazone and sulfentrazone;

triazolopyrimidine herbicides such as cloransulam, diclosulam, florasulam, flumetsulam, metosulam and penoxsulam;

uracil herbicides such as butafenacil, bromacil, flupropacil, isocil, lenacil and terbacil;

urea herbicides such as benzthiazuron, cumyluron, cycluron, dichloralurea, diflufenzopyr, isonoruron, isouron, methabenzthiazuron, monisouron and noruron;

phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron and thidiazuron; sulfonylurea herbicides including:

pyrimidinylsulfonylurea herbicides such as amidosulfuron; azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron;

triazinylsulfonylurea herbicides such as chlorsulfuron, cinosulfuron, ethametsulfuron, iodosulfuron, metsulfuron, prosulfuron, thifensulfuron, triasulfuron, tribenuron, triflusulfuron and tritosulfuron; and thiadiazolylurea herbicides such as buthiuron, ethidimuron, tebuthiuron, thiazafluron and thidiazuron; and unclassified herbicides such as KIH-485, acrolein, allyl alcohol, azafenidin, benazolin, bentazone, benzobicyclon, buthidazole, calcium cyanamide, cambendichlor, chlorfenac, chlorfenprop, chlorflurazole, chlorflurenol, cinmethylin, clomazone, CPMF, cresol, ortho-dichlorobenzene, dimepiperate endothal, fluoromidine, fluridone, flurochloridone, flurtamone, fluthiacet, indanofan, methyl isothiocyanate, OCH, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan and tritac.

The weight ratio of dicamba to other herbicide will depend on the nature of the other herbicide and desired loading of dicamba.

However, typically the weight ratio of dicamba to other herbicide (or herbicides) is in the range of from 30:1 to 1:10. Preferably dicamba will constitute more than 15% w/w of the total herbicide content, more preferably at least 70% w/w and most preferably at least 80% w/w.

In one set of embodiments, the other herbicide comprises a pyridine herbicide selected from the group consisting of picloram, clopyralid, aminopyralid, fluroxypyr and triclopyr.

In a further set of embodiments, the other herbicide comprises a phenoxyalkanoic acid herbicide selected from the group consisting of 2,4-D, MCPA, dichlorprop, dichlorprop-P, mecoprop and mecoprop-P.

The invention exhibits increased efficacy of the benzoic acid herbicide on an active gram for gram basis when compared to benzoic acid herbicides presently sold in the marketplace, such as salts, amine salts and esters.

The invention exhibits lower volatility and reduced propensity to drift when compared to other benzoic acid herbicide formulations presently sold in the marketplace.

The invention will now be described with reference to the following Examples. It is to be understood that the Examples are provided by way of illustration of the invention and that they are in no way limiting to the scope of the invention.

EXAMPLES

Example 1

The examples compare the effect of different alkanolamines on the stability of emulsifiable concentrates. Compositions were prepared by combining the components in Table 1 in the amounts listed using the method of manufacture described below.

TABLE 1

| Material | Ex. 1 | Ex. 2 | Ex. 3 | Ex. 4 |
|---|---|---|---|---|
| Dicamba tech (92.4%) | 43.3 | 48.75 | 48.75 | 48.75 |
| Kemmat HF60 | 3.5 | 3.5 | 3.5 | 3.5 |
| TERMUL 1284 | 1.5 | 1.5 | 1.5 | 1.5 |
| TOXIMUL 8320 | 5.0 | 5.0 | 5.0 | 5.0 |
| MEA (99%) | 5.0 | — | — | — |
| TIPA (85%) | — | 5.0 | — | — |
| MIPA (100%) | — | — | 5.0 | — |

TABLE 1-continued

| Material | Ex. 1 | Ex. 2 | Ex. 3 | Ex. 4 |
|---|---|---|---|---|
| DEA (85%) | — | — | — | 5.0 |
| Solvesso200 | 10 | 10 | 10 | 10 |
| Hallcomid 8-10 | To 100 ml | To 100 ml | To 100 ml | To 100 ml |
| Observation All emulsification measurement in CIPAC Standard D Water. | Good Emulsification nil cream in 30 minutes | Emulsification not as good as Ex. 1 | 2 ml cream in 30 minutes not as good as Ex. 1 | 1.0 ml cream in 30 minutes not as good as Ex. 1 |

Method of Manufacture

Step 1: Weight all excipients into a 250 ml beaker.
Step 2: Add a magnetic flea to the beaker, place beaker on a hot plate, commence stirring & heat to 75 Deg. C.
Step 3: Continue heating at 75 Deg. C while stirring for approximately 1.0 hour or until all solids have dissolved.
Step 4: Continue heating at 75 Deg. C while stirring add Monoethanolamine slowly.

Example 5

450 g/L Dicamba Acid and Monoethanolamine at 5% w/v

A composition in accordance with the invention comprising dicamba acid herbicide and monoethanolamine was prepared by combining the components of Table 2 using the method of manufacture described below. The results are described in Table 3.

TABLE 2

| Ingredients | Quantity |
|---|---|
| Dicamba acid (92.4%) | 48.75 g |
| KEMMAT HF60 | 3.5 g |
| TERMUL 1284 | 1.50 g |
| TOXIMUL 8320 | 5.0 g |
| Monoethanolamine (MEA) 100% | 5.0 g |
| SOLVESSO 200 | 10.0 g |
| Hallcomid M 8-10 | to 100 ml |

Method of Manufacture:

Step 1: Weigh 95% of the Hallcomid M 8-10 into a 250 ml beaker
Step 2: Add a magnetic flea to the beaker, place beaker on a stirrer, commence stirring
Step 3: While continuing to stir, maintain the temperature at 75° C., CHARGE in Kemmat HF60,TERMUL1284, TOXIMUL8320 and Solvesso 200
Step 4: Continue stirring until a clear solution is obtained
Step 5: Weigh the Dicamba acid tech & transfer to the above solution slowly
Step 6: Continue heating at 75° C. while stirring for 30 min or until a clear solution is obtained
Step 7: When all the solid material has dissolved, add required quantity of 100% Monoethanolamine
Step 8: Once all the materials have been charged to the formulation vessel, allow the product to continue mixing for at least 30 minutes or until a homogenous mixture is achieved and then cool the formulation to 20° C.
Step 9: Remove the beaker, transfer the content to 100 ml volumetric flask and make up the Volume to 100 ml with Hallcomid M810

Results

TABLE 3

| Parameters | INITIAL | 2 w at 54° C. |
|---|---|---|
| Appearance | Amber coloured clear liquid | Amber coloured clear liquid |
| Active content (Dicamba acid), g/L | 449 | 448 |
| Density (20° C.), g/ml | 1.122 | 1.122 |
| pH (1% dilution in DI water) | 2.90 | 2.89 |
| Emulsion Stability (CIPAC MT36.1) CIPAC STD A water | Very good emulsification | Very good emulsification |
| % Oil (30 min; 2 h; 24 hrs) | (0; 0; 0) | (0; 0; 0) |
| % cream (30 min; 2 h; 24 hrs) CIPAC STD D water | (0; 0; 0) | (0; 0; 0) |
| % Oil (30 min; 2 h; 24 hrs) | (0; 0; 0) | (0; 0; 0) |
| % cream (30 min; 2 h; 24 hrs) Low temp storage stab. (CIPAC MT39.3) | (0; 0; 0) | (0; 0; 0) |
| 24 hrs: | | Stable. No crystallization. |
| 7 days (seeding): | | Stable. No crystallization. |

Example 6

400 g/L Dicamba Acid

The composition of the invention comprising dicamba acid herbicide was prepared by combining the components shown in Table 4 using the Method of Manufacture described. The resulting composition had the properties shown in Table 5.

TABLE 4

| Ingredients | Quantity |
|---|---|
| Dicamba acid (92.5%) | 43.24 g |
| KEMMAT HF60 | 3.5 g |
| TERMUL 1284 | 1.5 g |
| TOXIMUL 8320 | 5.0 g |
| Monoethanolamine(MEA) 100% | 5.0 g |
| SOLVESSO 200 | 10.0 g |
| Hallcomid M 8-10 | to 100 ml |

Method of Manufacture:

Step 1: Weigh 95% of the Hallcomid M 810 into a 250 ml beaker
Step 2: Add a magnetic flea to the beaker, place beaker on a stirrer, commence stirring
Step 3: While continuing to stir, maintain the temperature at 75° C., CHARGE in Kemmat HF60,TERMUL1284, TOXIMUL8320 and Solvesso 200
Step 4: Continue stirring until a clear solution is obtained Step 5: Weigh the Dicamba acid tech & transfer to the above solution slowly Step 6: Continue heating at 75° C. while stirring for 30 min or until a clear solution is obtained Step 7: When all the solid material has dissolved, add required quantity of 100% Monoethanolamine Step 8: Once all the materials have been charged to the formulation vessel, allow the product to continue mixing for at least 30 minutes or until a homogenous mixture is achieved and then cool the formulation to 20° C.

Step 9: Remove the beaker, transfer the content to 100 ml volumetric flask and make up the Volume to 100 ml with Hallcomid M810

Results

TABLE 5

| Parameters | INITIAL | 2 w at 54° C. |
|---|---|---|
| Appearance | Amber coloured clear liquid | Amber coloured clear liquid |
| Active content (Dicamba acid), g/L | 394 | 393 |
| Density (20° C.), g/ml | 1.097 | 1.097 |
| pH (1% dilution in DI water) | 2.93 | 2.94 |
| Emulsion Stability (CIPAC MT36.1) | Very good emulsification | Very good emulsification |
| CIPAC STD A water | | |
| % Oil (30 min; 2 h; 24 hrs) | (0; 0; 0) | (0; 0; 0) |
| % cream (30 min; 2 h; 24 hrs) | (0; 0; 0) | (0; 0; 0) |
| CIPAC STD D water | | |
| % Oil (30 min; 2 h; 24 hrs) | (0; 0; 0) | (0; 0; 0) |
| % cream (30 min; 2 h; 24 hrs) | (0; 0; 0) | (0; 0; 0) |
| Low temp storage stab. (CIPAC MT39.3) | | |
| 24 hrs: | | Stable. No crystallization. |
| 7 days (seeding): | | Stable. No crystallization. |

Example 7

Formulations and Manufacturing Method Details:

Example 7a

Emulsifiers Added Prior to Benzoic Acid Herbicide 400 g/L Dicamba Acid EC: batch size 200 ml. The composition was prepared by combining the components in Table 6 using the method of manufacture described. The properties of the composition are shown in Table 7.

TABLE 6

| Ingredients | Qty (g) for 100 ml | Actual batch Quantity (200 ml) |
|---|---|---|
| Dicamba acid (92.5%) | 43.24 g | 86.48 g |
| KEMMAT HF60 | 3.5 g | 7.0 g |
| TERMUL 1284 | 1.5 g | 3.0 g |
| TOXIMUL 8320 | 5.0 g | 10.0 g |
| Monoethanolamine(MEA) 100% | 5.0 g | 10.0 g |
| SOLVESSO 200 | 10.0 g | 20.0 g |
| Hallcomid M 8-10 | to 100 ml | to 200 ml |

Method of Manufacture

Step 1: Weigh 95% of the Hallcomid M 8-10) into a 250 ml beaker

Step 2: Add a magnetic flea to the beaker, place beaker on a hot plate, commence stirring and heat to 75 Deg. C.

Step 3: While maintaining temperature at 75 degree C., add KEMMAT HF60, Toximul 8320, TERMUL1284 and Solvesso 200

Step 4: Continue to mix until a clear solution is achieved

Step 5: Add Dicamba tech, maintain temperature at 75 degree C., continue to mix until a clear solution is achieved Step 6: Switch off the heating, add Monoethanolamine Step 7: Continue stirring for approximately 20 to 30 minutes, or until clear.

Step 8: Remove the beaker, transfer the content to 200 ml vol. Flask, make up to the mark with Hallcomid M 8-10

Preliminary Test Results:

TABLE 7

| Appearance | Amber coloured clear liquid |
|---|---|
| Low temp stability CIPAC MT 39.3 | did not freeze, did not crystallize, did not separate |
| 1% pH CIPAC MT 75.3 | 3.1 |
| Density | 1.097 |
| Emulsion characteristics in Std D | good, nil cream after 30 minutes |

Example 7b

Benzoic Acid Herbicide Added after Emulsifiers 400 g/L Dicamba Acid EC: batch size 200 ml, formula similar to previous Examples but prepared using a method of manufacture in which the benzoic acid herbicide was added before emulsifier. The composition was prepared by combining the components shown in Table 8 using the method of manufacture. The properties of the composition are shown in Table 9.

TABLE 8

| Ingredients | Qty(g) for 100 ml | Actual batch Quantity (200 ml) |
|---|---|---|
| Dicamba acid (92.5%) | 43.24 g | 86.48 g |
| KEMMAT HF60 | 3.5 g | 7.0 g |
| TERMUL 1284 | 1.5 g | 3.0 g |
| TOXIMUL 8320 | 5.0 g | 10.0 g |
| Monoethanolamine(MEA) 100% | 5.0 g | 10.0 g |
| SOLVESSO 200 | 10.0 g | 20.0 g |
| Hallcomid M 8-10 | to 100 ml | to 200 ml |

Method of Manufacture

Step 1: Weigh 95% of the Hallcomid M 8-10 and Solvesso 200 (total qty) into a 250 ml beaker.

Step 2: Add a magnetic flea to the beaker, place beaker on a hot plate, commence stirring and heat to 75 Deg. C.

Step 3: Add Dicamba tech, continue to mix until a clear solution is achieved

Step 4: While maintaining temperature at 75 degree C., add KEMMAT HF60, TERMUL1284 and Toximul 8320.

Step 5: Continue to mix until a clear solution is achieved.

Step 6: Switch off the heating, add Monoethanolamine.

Step 7: Continue stirring for approximately 20 to 30 minutes, or until clear.

Step 8: Remove the beaker, transfer the content to 200 ml vol. Flask, make up to the mark, with Hallcomid M8-10.

Preliminary Test Results:

TABLE 9

| Appearance | Amber coloured clear liquid |
|---|---|
| Low temp stability CIPAC MT 39.3 | did not freeze, did not crystallize, did not separate |
| 1% pH CIPAC MT 75.3 | 2.95 |
| Density | 1.096 |
| Emulsion characteristics in Std D | good, nil cream after 30 minutes |

Example 8

450 g/L Dicamba Acid EC: batch size 200 ml, formula similar to Example 6 but prepared using a method in which HALLCOMID and SOLVESSO 200 solvents were initially added.

The composition was prepared by combining the components shown in Table 10 using the listed method of manufacture. The properties of the composition are shown in Table 11.

TABLE 10

| Ingredients | Qty (g) for 100 ml | Actual batch Quantity (200 ml) |
|---|---|---|
| Dicamba acid (92.5%) | 48.65 | 97.30 g |
| KEMMAT HF60 | 3.5 g | 7.0 g |
| TERMUL 1284 | 1.50 g | 3.0 g |
| TOXIMUL 8320 | 5.0 g | 10.0 g |
| Monoethanolamine(MEA) 100% | 5.0 g | 10.0 g |
| SOLVESSO 200 | 10.0 g | 20.0 g |
| Hallcomid M 8-10 | To 100 ml | to 200 ml |

Method of Manufacture

Step 1: Weigh 95% of the Hallcomid M 8-10 and Solvesso 200 (total qty) into a 250 ml beaker.

Step 2: Add a magnetic flea to the beaker, place beaker on a hot plate, commence stirring and heat to 75 Deg. C.

Step 3: Add Dicamba tech, continue to mix until a clear solution is achieved

Step 4: While maintaining temperature at 75 degree C., add KEMMAT HF60, TERMUL1284 and Toximul 8320.

Step 5: Continue to mix until a clear solution is achieved.

Step 6: Switch off the heating, add Monoethanolamine.

Step 7: Continue stirring for approximately 20 to 30 minutes, or until clear.

Step 8: Remove the beaker, transfer the content to 200 ml vol. Flask, make up to the mark, with Hallcomid M8-10.

Preliminary Test Results:

TABLE 11

| Appearance | Amber coloured clear liquid |
|---|---|
| Low temp stability CIPAC MT 39.3 | did not freeze, did not crystallize, did not separate |
| 1% pH CIPAC MT 75.3 | 3.02 |
| Density | 1.117 |
| Emulsion characteristics in Std D | good, nil cream after 30 minutes |

Example 9

This Example was prepared using Methoxypropyl amine (MOPA) instead of Monoethanolamine (MEA) and by a method in which formulations were attempted to evaluate Methoxy Propyl Amine (MOPA) in Dicamba acid EC. The composition was prepared by combining the components of Table 12 using the method of manufacture and were tested for emulsion stability, density and low temperature storage stability. The results are shown in Table 13.

400 g/L Dicamba Acid EC: batch size 200 ml, formulation with MOPA, prepared using a new method of manufacture.

TABLE 12

| Ingredients | Qty(g) for 100 ml | Actual batch Quantity (200 ml) |
|---|---|---|
| Dicamba acid (92.5%) | 43.24 g | 86.48 g |
| KEMMAT HF60 | 3.5 g | 7.0 g |
| TERMUL 1284 | 1.5 g | 3.0 g |
| TOXIMUL 8320 | 5.0 g | 10.0 g |
| Methoxypropylamine (MOPA) 100% | 5.0 g | 10.0 g |
| SOLVESSO 200 | 10.0 g | 20.0 g |
| Hallcomid M 8-10 | to 100 ml | to 200 ml |

Method of Manufacture

Step 1: Weigh 95% of HALLCOMID M 8-10 and Solvesso 200 (total qty) into a 250 ml beaker.

Step 2: Add a magnetic flea to the beaker, place beaker on a hot plate, commence stirring and heat to 75 Deg. C.

Step 3: Add Dicamba tech, continue to mix until a clear solution is achieved.

Step 4: While maintaining temperature at 75 degree C., add KEMMAT HF60, TERMUL1284 and Toximul 8320.

Step 5: Continue to mix until a clear solution is achieved.

Step 6: Switch off the heating, add MOPA.

Step 7: Continue stirring for approximately 20 to 30 minutes, or until clear.

Step 8: Remove the beaker, transfer the content to 200 ml vol. Flask, make up to the mark, with Hallcomid M8-10.

Preliminary Test Results:

TABLE 13

| Appearance | Amber coloured clear liquid |
|---|---|
| Low temp stability CIPAC MT 39.3 | did not freeze, did not crystallize, did not separate |
| 1% pH CIPAC MT 75.3 | 3.19 |
| Density | 1.094 |
| Emulsion characteristics in Std D | satisfactory, 1 ml cream after 30 minutes |

Example 10

450 g/L Dicamba Acid EC: batch size 200 ml, formulation with MOPA, prepared using a new method of manufacture.

The composition was prepared by combining the components shown as Table 14 using the method of manufacture listed and provided the results shown in Table 15.

TABLE 14

| Ingredients | Qty (g) for 100 ml | Actual batch Quantity (200 ml) |
|---|---|---|
| Dicamba acid (92.5%) | 48.65 | 97.30 g |
| KEMMAT HF60 | 3.5 g | 7.0 g |
| TERMUL 1284 | 1.50 g | 3.0 g |
| TOXIMUL 8320 | 5.0 g | 10.0 g |

TABLE 14-continued

| Ingredients | Qty (g) for 100 ml | Actual batch Quantity (200 ml) |
|---|---|---|
| Methoxypropylamine (MOPA) 100% | 5.0 g | 10.0 g |
| SOLVESSO 200 | 10.0 g | 20.0 g |
| Hallcomid M 8-10 | To 100 ml | to 200 ml |

Method of Manufacture

Step 1: Weigh 95% of HALLCOMID M 8-10 and Solvesso 200 (total qty) into a 250 ml beaker.

Step 2: Add a magnetic flea to the beaker, place beaker on a hot plate, commence stirring and heat to 75 Deg. C.

Step 3: Add Dicamba tech, continue to mix until a clear solution is achieved.

Step 4: While maintaining temperature at 75 degree C., add KEMMAT HF60, TERMUL1284 and Toximul 8320.

Step 5: Continue to mix until a clear solution is achieved.

Step 6: Switch off the heating, add Methyoxypropylamine (MOPA).

Step 7: Continue stirring for approximately 20 to 30 minutes, or until clear.

Step 8: Remove the beaker, transfer the content to 200 ml vol. Flask, make up to the mark, with Hallcomid M8-10.

Preliminary Test Results:

TABLE 15

| Appearance | Amber coloured clear liquid |
|---|---|
| Low temp stability CIPAC MT 39.3 | did not freeze, did not crystallize, did not separate |
| 1% pH CIPAC MT 75.3 | 2.82 |
| Density | 1.117 |
| Emulsion characteristics in Std D | Satisfactory, 1 ml cream after 30 minutes |
| Viscosity @ 5 degree C. (cp) | 620 cP |
| Viscosity @ 20 degree C. (cp) | 254 cP |

Examples 11-16

Dicamba Acid EC

The dicamba acid EC compositions in Table 16 were prepared according to them method identified in the Table as set out below.

TABLE 16

|  | Ex 11 | Ex 12 | Ex 13 | Ex 14 | Ex 15 | Ex 16 |
|---|---|---|---|---|---|---|
|  | 400 g/L Dicamba Acid EC | | 450 g/L Dicamba Acid EC | | 400 g/L Dicamba Acid EC | 400 g/L Dicamba Acid EC |
| Material/Method | SS1 (400 g/L) | SS2 (400 g/L) | SS3 (450 g/L) | SS4 (450 g/L) | SS5 (400 g/L) | SS6 (450 g/L) |
| Dicamba tech (92.5%) | 86.48 | 86.48 | 97.28 | 97.28 | 86.48 | 97.28 |
| Kemmat HF60 | 7.0 | 7.0 | 7.0 | 7.0 | 7.0 | 7.0 |
| TERMUL 1284 | 3.0 | 3.0 | 3.0 | 3.0 | 3.0 | 3.0 |
| TOXIMUL8320 | 10.0 | 10.0 | 10.0 | 10.0 | 10.0 | 10.0 |
| MEA (100%) | 10.0 | 10.0 | 10.0 | 10.0 | 10.0 | 10.0 |
| Solvesso200 | 20 | 20 | 20 | 20 | 20 | 20 |
| Hallcomid 8-10 | To 200 ml | To 200 ml | To 200 ml | To 200 ml | To 200 ml | To 200 ml |
| Observation |  |  |  |  |  |  |
| Appearance | Amber coloured limpid liquid | Amber coloured limpid liquid | Amber coloured limpid liquid | Amber coloured limpid liquid | Amber coloured limpid liquid | Amber coloured limpid liquid |
| Low temp stability CIPAC MT 39.3 | Did not freeze, did not crystallize, did not separate | Did not freeze, did not crystallize, did not separate | Did not freeze, did not crystallize, did not separate | Did not freeze, did not crystallize, did not separate |  |  |
| 1% pH CIPAC MT 75.3 | 3.1 | 2.95 | 2.87 | 3.02 |  |  |
| Density | 1.097 | 1.096 | 1.117 | 1.117 |  |  |
| Emulsion characteristics in Std D | Good, nil cream after 30 minutes | Good, nil cream after 30 minutes | Good, nil cream after 30 minutes | Good, nil cream after 30 minutes |  |  |

Method of manufacture for SS1 and SS3
(Dicamba tech. added after the addition of emulsifiers)
Step 1: Weigh 95% of HALLCOMID M 8-10) into a 250 ml beaker,
Step 2: Add a magnetic flea to the beaker, place beaker on a hot plate, commence stirring & heat to 75 Deg. C.
Step 3: while maintaining temperature at 75 degree C., add KEMMAT HF60, Toximul 8320, TERMUL1284 and Solvesso 200
Step 4: continue to mix until a clear solution is achieved
Step 5: Add Dicamba tech, maintain temperature at 75 degree C., Continue to mix until a clear solution is achieved
Step 6: switch off the heating, add alkaline base.
Step 7: Continue stirring for approximately 20 to 30 minutes, or until clear.
Step 8: remove the beaker, transfer the content to 200 ml vol. Flask, make up to the mark with Hallcomid M 8-10
Method of Manufacture for SS2, SS4, SS5 and SS6
(Dicamba tech added prior to the addition of emulsifiers)
Step 1: Weigh 90% of HALLCOMID M 8-10 and Solvesso 200 (total qty) into a 250 ml beaker,
Step 2: Add a magnetic flea to the beaker, place beaker on a hot plate, commence stirring & heat to 75 Deg. C.
Step 3: Add Dicamba tech, continue to mix until a clear solution is achieved
Step 4: while maintaining temperature at 75 degree C., add KEMMAT HF60, TERMUL1284 and Toximul 8320
Step 5: continue to mix until a clear solution is achieved
Step 6: switch off the heating, add alkaline base.
Step 7: Continue stirring for approximately 20 to 30 minutes, or until clear.
Step 8: remove the beaker, transfer the content to 200 ml vol. Flask, make up to the mark., with Hallcomid M8-10
Note:
In SS1 and SS3, Dicamba tech. was added after the addition of emulsifiers, while in SS2, SS4, SS5 and SS6 Dicamba tech. was added prior to the addition of emulsifiers. Refer to Method of manufacture for details.

Examples 17-22

EC Containing Both Dicamba and Fluroxypyr

Emulsifiable concentrates were prepared by combining the components shown in Table 17 using the method of manufacture shown below. The compositions were found to have good stability and properties shown also in Table 17.

TABLE 17

|  | E17 | E18 | E19 | E20 | E21 | E22 |
|---|---|---|---|---|---|---|
| Fluroxypyr | 110 | 110 | 110 | 110 | 110 | 110 |
| Dicamba | 200 | 200 | 200 | 200 | 200 | 200 |
| NMP | 50 | 50 | 50 | 50 | 50 | 50 |
| MOPA 100% | 10 | 0 | 20 | 30 | 40 | 10 |
| Tomamine 100% |  |  |  |  |  | 20 |
| Hallcomid M8-10 | 510 | 510 | 510 | 510 | 510 | 510 |
| Solvesso 200 | 50 | 50 | 50 | 50 | 50 | 50 |
| Termul 1284 | 15 | 15 | 15 | 15 | 15 | 15 |
| Toximul 8320 | 50 | 50 | 50 | 50 | 50 | 50 |
| Kermat HF60 | 35 | 35 | 35 | 35 | 35 | 35 |
| Appearance | Clear solution | Clear solution | Clear solution | Clear solution | Clear solution | Clear solution |
| Low temp stability | pass | pass | pass | pass | pass | pass |
| 1% pH | 2.87 | 2.76 | 2.96 | 3.07 | 3.34 | 2.91 |
| Density | 1.059 | 1.059 | 1.059 | 1.059 | 1.059 | 1.059 |
| Emulsion A 30 mins | 0 ml pass | 0 ml pass | 0 ml pass | 0 ml pass | 0 ml pass | 0 ml pass |
| Emulsion D 30 mins | 0 ml pass | 0 ml pass | 0 ml pass | 0 ml pass | 0 ml pass | 0 ml pass |
| Emulsion A 2 hours | 0.1 ml pass | 0.2 ml pass | 0 ml pass | 0 ml pass | 0 ml pass | 0.2 ml pass |
| Emulsion D 2 hours | 0.1 ml pass | 0.3 ml pass | 0 ml pass | 0 ml pass | 0 ml pass | 0.1 ml pass |
| Foaming ml | 30 | 35 | 35 | 30 | 50 |  |

Method of Manufacture—1 L batches with Fluroxypyr

Step 1: Weight out Hallcomid M-8-10 and NMP into a 2 L glass beaker and add in Fluroxypyr and heat on a hot plate to 75° C. whilst stirring with an overhead stirrer until a clear solution results.
Step 2: When the above solution is clear 2, 4D can optionally be added and maintain at 75° C. whilst stirring with an overhead stirrer until a clear solution results.
Step 3: To a 400 ml glass beaker with a magnetic stirrer add in Solvesso 200, Toximul 1284, and Toximul 8320 and mix at 50° C. until homogenous and a clear solution results.
Step 4: To the 2 L beaker add in the contents of the 400 ml beaker whilst vigorously stirring and maintain the temperature at 75° C.
Step 5: Mix until homogenous and clear and allow to cool.
Step 6: When at 40° C. check 1% pH.
Step 7: Add in Base and mix for ten minutes.
Step 8: Allow to cool to 20° C. and fill into a 1 L batch and make up to volume with Hallcomid M-8-10.

Examples 23-32

EC Compositions Containing Dicamba and Picloram

Emulsifiable concentrate compositions were prepared by combining the components shown in Table 18 in the parts by weight listed and using the manufacturing method described. Composition properties are also recorded in Table 18.

TABLE 18

| All g/L | Ex 23 | Ex 24 | Ex 25 | Ex 26 | Ex 27 | Ex 28 | Ex 29 | Ex 30 | Ex 31 | Ex 32 |
|---|---|---|---|---|---|---|---|---|---|---|
| Picloram as 100% | 22.5 | 22.5 | 22.5 | 22.560 | 22.5 | 22.5 | 25 | 25 | 25 | 22.5 |
| Dicamba as 100% | 260 | 260 | 260 | 260 | 260 | 260 | 300 | 300 | 300 | 260 |
| Hallcomid M8-10 | 567 | 520 | 520 | 550 | 550 | 550 | 535 | 535 | 535 | 560 |
| Solvesso 200 | 50 | 50 | 50 | 50 | 50 | 50 | 50 | 50 | 50 | 50 |
| Termul 1284 | 15 | 15 | 15 | 15 | 15 | 15 | 15 | 15 | 15 | 15 |
| Toximul 8320 | 50 | 50 | 50 | 50 65 | 50 | 50 | 50 | 50 | 50 | 50 |
| Kermat HF60 | 35 | 35 | 35 | 35 | 35 | 35 | 35 | 35 | 35 | 35 |

TABLE 18-continued

| All g/L | Ex 23 | Ex 24 | Ex 25 | Ex 26 | Ex 27 | Ex 28 | Ex 29 | Ex 30 | Ex 31 | Ex 32 |
|---|---|---|---|---|---|---|---|---|---|---|
| MEA 100% | 10 | | 20 | | | | | | | 5 |
| TEA 99% | | | | | | | | | | |
| MOPA 100% | | | | 10 | 20 | 30 | 10 | 20 | 30 | 5 |
| Appearance | clear solution | clear solution | clear solution | clear solution | clear solution | clear solution | clear solution | clear solution | clear solution | clear solution |
| Low temp stability | clear solution | clear solution | clear solution | clear solution | clear solution | clear solution | clear solution | clear solution | clear solution | clear solution |
| 1% pH | 2.8 | 2.69 | 3.02 | 2.75 | 2.95 | 3.2 | 2.64 | 2.83 | 3.06 | 2.8 |
| Density | 1.036 | 1.025 | 1.025 | 1.033 | 1.033 | 1.033 | 1.052 | 1.052 | 1.052 | 1.034 |
| picloram g/L initial | 24.3 | 23.2 | 23.4 | 23.8 | 23.3 | 22.8 | 25.5 | 25 | 24.5 | |
| picloram g/L 2 wk RT | 24.6 | 23.6 | 23.2 | 23.6 | 23.1 | 22.7 | | | | |
| picloram g/L 2 wk 54 C. | 24.4 | 23.4 | 23 | 23.3 | 22.9 | 22.5 | | | | |
| picloram g/L 2 wk 0 C. | 24.6 | 23.6 | 23.2 | 23.6 | 23.1 | 22.7 | | | | |
| Dicamba g/L initial | 254 | 238 | 239 | 257 | 252 | 248 | 296 | 290 | 284 | |
| Dicamba g/L 2 wk RT | 258 | 241 | 237 | 257 | 252 | 247 | | | | |
| Dicamba g/L 2 wk 54 C. | 257 | 241 | 236 | 257 | 251 | 247 | | | | |
| Dicamba g/L 2 wk 0 C. | 258 | 241 | 238 | 257 | 253 | 248 | | | | |
| Emulsion A | pass | pass | pass | pass | pass | pass | pass | pass | pass | pass |
| Emulsion D | pass | pass | pass | pass | pass | pass | pass | pass | pass | pass |
| Foaming ml | 10 | 10 | 10 | 20 | 20 | 20 | 20 | 20 | 20 | |

Method of Manufacture—1 L batches with Dicamba and Picloram
Step 1: Weight out 95% of Hallcomid M-8-10 in a 2 L glass beaker and heat to 75° C. whilst stirring with an overhead stirrer.
Step 2: Maintaining the temperature at 75° C. add in Picloram and stir vigorously until fully dissolved.
Step 3: Maintaining the temperature at 75° C. add in Dicamba and stir vigorously until fully dissolved and then add in.
Step 4: In a 400 ml glass beaker add in Solvesso followed by Kermat HF60, Termul 1284 and Toximul 8320 and heat to 50° C. and mix until a clear solution results.
Step 5: While stirring vigorously and maintaining the temperature 75° C. add in the above based Solvesso 200 mix and stir until homogenous and clear.
Step 6: Then cool to RT and while stirring slowly add in BASE and stir until homogenous.
Step 7: Allow to return to RT and make to 1 L with Hallcomid.

Comparative Examples CE1 to CE9

The following Comparative Examples related to compositions prepared using a range of solvents in accordance with the following procedure:
Step 1: Weight all excipients into a 250 ml beaker.
Step 2: Add a magnetic flea to the beaker, place beaker on a hot plate, commence stirring and heat to 75 Deg. C.
Step 3: Continue heating at 75 Deg. C while stirring for approximately 1.0 hour or until all solids have dissolved.

TABLE 20

| Material | CE1 | CE2 | CE3 |
|---|---|---|---|
| Dicamba (92.8%) | 48.49 | 48.49 | 48.49 |
| Atlas G-5002L | 10 | | |
| Synperonic A11 | | 10 | |
| Calsogen ARL100ND | | | 10 |
| Caromax 200LN | 5 | 5 | 5 |
| 2-Butoxyethanol | 36.51 | 36.51 | 36.51 |

CE7 to CE9 Exhibited Poor Emulsification.

TABLE 21

| Material | CE4 | CE5 | CE6 | CE7 |
|---|---|---|---|---|
| Dicamba (92.8%) | 48.49 | 48.49 | 48.49 | 48.49 |
| Calsogen ARL100ND | 5.5 | 5.5 | 5.5 | 5.5 |
| Emulsogen EL360 | 2.5 | 2.5 | 2.5 | — |
| Emulsogen EL540 | 2.0 | 2.0 | 2.0 | 2.0 |
| Acetophenone | 10.0 | 15 | 20.0 | — |
| Solvesso 200ULN | To 100 g | To 100 g | To 100 g | To 100 g |
| BEROL 106 | — | — | — | 4.5 |
| NMPR-200 | — | — | — | 15.0 |
| | 12% crystallization (overnight standing at RT) | 10% crystallization (overnight standing at RT) | 5% crystallization (overnight standing at RT) | 10% crystallization (overnight standing at RT) |

TABLE 22

| Material | CE8 | CE9 |
|---|---|---|
| Dicamba (92.8%) | 43.1 | 43.1 |
| Calsogen ARL100ND | 9.0 | 9.0 |
| BEROL 106 | 6.0 | 6.0 |
| Rodiasolv-Match 11 | 10.0 | 20.0 |
| Solvesso 200ULN | To 100 g | To 100 g |
| Observation | Did not dissolve completely after 2 hour of stirring at 75 Deg. C. | Complete solubilisation after 1 hour stirring at 75 Deg. C. Crystallizes on overnight standing at RT. |

Conclusion for Examples CE1 to CE9

Several attempts were made to formulate an EC product using various solvents and emulsifiers, but the formulations were not satisfactory. The combinations with 40% to 45% dicamba loading showed very poor emulsifications.

Comparative Examples 10-13

The emulsifiable concentrates were prepared using the procedure of Comparative Examples 1-9 and the observations listed. In general, the compositions did not have the desired stability.

TABLE 23

| Material | CE10 | CE11 | CE12 |
|---|---|---|---|
| Dicamba tech 92.8% | 43.1 | 43.1 | 43.1 |
| Kemmat HF60 | 5.5 | 5.5 | 5.5 |
| TERMUL1284 | 2.5 | 2.5 | 2.5 |
| Synperonic PE F127 | 3.0 | 3 | 3 |
| Solvesso 200 | 10 | 10 | To 100 g |
| Hallcomid 8-10 | NIL | 15 | 20.0 |
| THFA | To 100 g | 20.9 | NIL |
| Observation | Poor emulsification | Poor emulsification | Poor emulsification |

TABLE 24

| Material | CE13 |
|---|---|
| Dicamba tech 100% | 43.1 |
| Kemmat HF60 | 5.0 |
| TERMUL1284 | 3.0 |
| Atlas G5002L | — |
| TERMUL1285 | — |
| TERIC16A30 | 2.0 |
| Solvesso 200 | 10 |
| Hallcomid 8-10 | To 100 g |
| Observations | Poor emulsification |

TABLE 26

| Material name | CE14 |
|---|---|
| Dicamba (92.4%) | 43.3 |
| KEMMAT HF60 | 5 |
| TERIC 16A30 | 2 |
| Synperonic PE/F127 | 3 |
| Tetrahydrofurfuryl alcohol | 35 |
| Propylene Glycol | 5 |
| Butyl Glysolv (2-Butoxyethanol) | To 100 g (6.7 g) |
| Observation | No emulsification |

In the Examples, the Products Identified are as Follows:
Atlas™ G-5002L—butyl block copolymer polymeric non-ionic oil-in-water emulsifier.
Synperonic™ A11—polyoxyethylene (11) $C_{12}$-$C_{15}$ alcohol non-ionic emulsifier.
Calsogen™ ARL 100ND—alkyl benzene sulfonate anionic emulsifier.
Solvesso™ 200—alkylbenzene IBP 220° C.
Solvesso™ 200 ULN—alkylbenzene IBP 220° C.
KEMMAT™ HF60—calcium dodecyl benzene sulfonate.
TERMUL™ 1284—ethoxylated castor oil emulsifier.
TOXIMUL™ 8320—butyl block copolymer, polymeric emulsifier.
HALLCOMID™ M 8-10 N,N-dimethyl decanamide
MEA—monoethanolamine
TIPA—triisopropanolamine
MIPA—monoisopropylamine
DEA—diethanolamine
TEA—triethanolamine
EDA—ethylenediamine
DETA—diethylenetriamine
MOPA—methoxypropylamine
THFA—tetrahydrofurfuryl alcohol
Rhodiasolv™ Match 11—non-ionic solvent blend
BEROL™ 106—ethoxylated castor oil

The invention claimed is:
1. An emulsifiable concentrate comprising a benzoic acid herbicide in the free acid form dissolved in an amide solvent and an amine,
   wherein the amine comprises at least one amine of formula (I)

wherein $R^1$ is $C_2$ to $C_6$ hydroxylalkyl or $C_1$ to $C_6$ alkoxy-substituted $C_2$ to $C_4$ alkyl, and $R_2$ and $R_3$ are hydrogen;
   wherein the amide solvent is of formula (II)

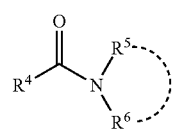

wherein
   $R^4$ is selected from the group consisting of hydrogen and $C_1$ to $C_{17}$ hydrocarbyl;
   $R^5$ is selected from the group consisting of $C_1$ to $C_{15}$ hydrocarbyl;
   $R^6$ is selected from the group consisting of $C_1$ to $C_{15}$ hydrocarbyl; and
   $R^5$ and $R^6$ may together form a ring incorporating the nitrogen of the amide comprising 4 or 5 methylene groups;
   wherein the herbicidal component of the composition consists of the benzoic acid herbicide and optionally one or more herbicides selected from the group consisting of picloram, clopyralid, aminopyralid, fluoroxypyr, triclopyr, 2,4-dichlorophenoxyacetic acid (2,4-D), 2-methyl-4-chlorophenoxyacetic acid (MCPA), dichlorprop, dichlorprop-P, mecoprop and mecoprop-P.
2. An emulsifiable concentrate according to claim 1 wherein, in the amine of formula I, $R^1$ is $C_1$ to $C_6$ alkoxy-substituted $C_2$ to $C_4$ alkyl.
3. An emulsifiable concentrate according to claim 1, wherein the amine is selected from the group consisting of ethanolamine, methoxypropylamine and hexyloxypropylamine.
4. An emulsifiable concentrate according to claim 1, wherein the amount of the amine in the concentrate composition is from 0.5% to 10% by weight based on the weight of an emulsifiable concentrate containing benzoic acid herbicide in acid form.
5. An emulsifiable concentrate according to claim 1, wherein the amount of the amine in the concentrate composition is from 3% to 5% by weight based on the weight of an emulsifiable concentrate containing benzoic acid herbicide in acid form.
6. An emulsifiable concentrate according to claim 1 wherein in the amide solvent of formula II
   $R^4$ is $C_6$ to $C_{17}$ alkyl; and
   $R^5$ and $R^6$ are independently selected from $C_1$ to $C_4$ alkyl.

7. An emulsifiable concentrate according to claim 1, wherein the amide solvent is selected from the group consisting of N,N-dimethyl octanamide, N,N-dimethyl decanamide, N,N-dimethyl caprylamide, N,N-dimethyl 2-ethylhexanoamide, N,N-dimethyl oleamide, N,N-dimethyllauricamide, N,N-dimethylmyristicamide, N,N-dimethyl 9-decenamide, and mixtures of two or more thereof.

8. An emulsifiable concentrate according to claim 1, wherein the benzoic acid herbicide is selected from the group consisting of 2,3,5-triiodobenzoic acid, chloramben and dicamba acid.

9. An emulsifiable concentrate according to claim 1, wherein the benzoic acid herbicide is present in an amount of at least 200 g acid per litre of emulsifiable concentrate.

10. An emulsifiable concentrate according to claim 1, wherein the benzoic acid herbicide is present in an amount of at least 450 g/L.

11. An emulsifiable concentrate according to claim 1 further comprising a hydrocarbon co-solvent having a flash point of at least 60.5° C. comprising at least one hydrocarbon selected from the group consisting of mono-, di- and trialkyl benzenes.

12. An emulsifiable concentrate according to claim 11, wherein the hydrocarbon co-solvent is present in an amount in the range of from 2% to 25% w/w of the emulsifiable concentrate.

13. An emulsifiable concentrate according to claim 1 comprising emulsifier in an amount in the range of from 5% w/w to 25% w/w of the concentrate composition.

14. An emulsifiable concentrate according to claim 13, wherein the emulsifier comprises a non-ionic emulsifier selected from the group consisting of alcohol ethoxylates, fatty acid ethoxylates, fatty amide ethoxylates and ethylene oxide/propylene oxide (EO/PO) block copolymers, in an amount in the range of from 2% w/w to 20% w/w of the concentrate composition.

15. An emulsifiable concentrate according to claim 13 comprising an anionic emulsifier in an amount of from 1% to 10% w/w of the concentrate composition and a non-ionic emulsifier in an amount of from 2% to 15% w/w of the concentrate composition.

16. A method of controlling weeds comprising providing an emulsifiable concentrate according to claim 1, diluting the concentrate with water to form an emulsion and applying the diluted composition to the weeds.

17. An emulsifiable concentrate composition comprising:
dicamba acid in an amount of at least 250 g/L;
amide solvent in an amount of from 25% to 60% w/w of the concentrate composition wherein the amide solvent is selected from the group consisting of N,N-dimethyl octanamide, N,N-dimethyl decanamide, N,N-dimethyl caprylamide, N,N-dimethyl 2-ethylhexanoamide, N,N-dimethyl oleamide, N,N-dimethylLauricamide, N,N-dimethylmyristicamide, N,N-dimethyl 9-decenamide, and mixtures of two or more thereof;
hydrocarbon co-solvent in an amount of from 2% to 25% w/w of the concentrate composition;
anionic emulsifier in an amount of from 1% to 10% w/w of the concentrate composition;
non-ionic emulsifier in an amount of from 2% to 25% w/w of the concentrate composition; and
monoethanolamine, methoxypropylamine or mixture thereof in an amount of from 0.5% to 10% by weight based on the weight of an emulsifiable concentrate composition.

18. An emulsifiable concentrate comprising:
a benzoic acid herbicide in the free acid form dissolved in an amide solvent, a hydrocarbon co-solvent, an amine, and an emulsifier;
wherein the benzoic acid herbicide is present in an amount of at least 200 g acid per litre of emulsifiable concentrate, and is selected from the group consisting of 2,3,5-triiodobenzoic acid, chloramben and dicamba acid;
wherein the amine is present in an amount from 0.5% to 10% by weight based on the weight of the emulsifiable concentrate and is an amine of formula (I)

wherein $R^1$ is $C_2$ to $C_6$ hydroxyalkyl or $C_1$ to $C_6$ alkoxy substituted $C_2$ to $C_4$ alkyl, and $R^2$ and $R^3$ are hydrogen;
wherein the amide solvent is present in an amount from 25% to 60% by weight based on the weight of the emulsifiable concentrate and is an amide of formula (II)

wherein $R^4$ is $C_6$ to $C_{17}$ alkyl, and $R^5$ and $R^6$ are independently selected from $C_1$ to $C_4$ alkyl;
wherein the hydrocarbon co-solvent is present in an amount from 2% to 25% by weight based on the weight of the emulsifiable concentrate;
wherein the emulsifier is present in an amount from 5% to 25% by weight based on the weight of the emulsifiable concentrate;
wherein the herbicidal component of the composition consists of the benzoic acid herbicide and optionally one or more herbicides selected from the group consisting of picloram, clopyralid, aminopyralid, fluoroxypyr, triclopyr, 2,4-D, MCPA, dichlorprop, dichlorprop-P, mecoprop and mecoprop-P.

* * * * *